Dec. 27, 1966  J. J. ZWISLOCKI  3,294,193
ACOUSTIC IMPEDANCE MEASURING INSTRUMENT
Filed Sept. 20, 1963
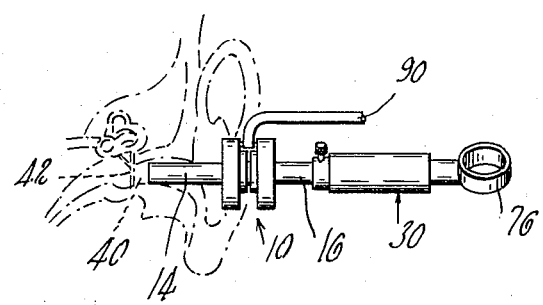
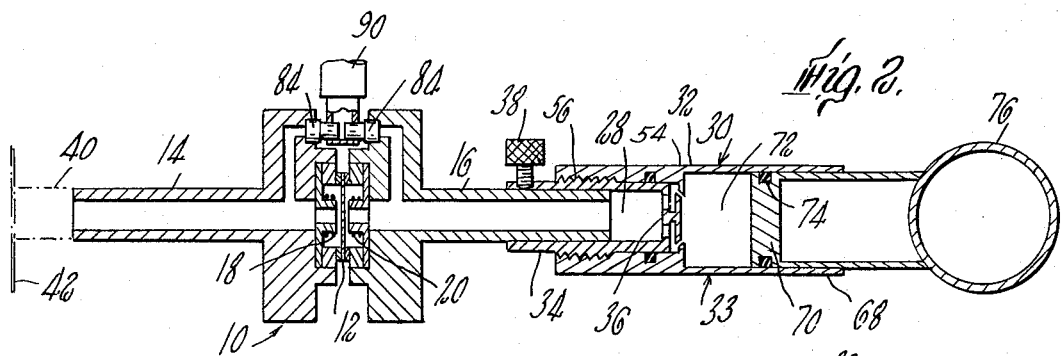
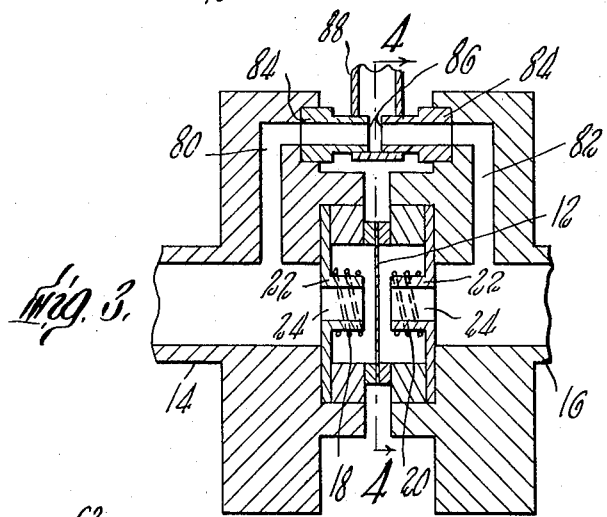
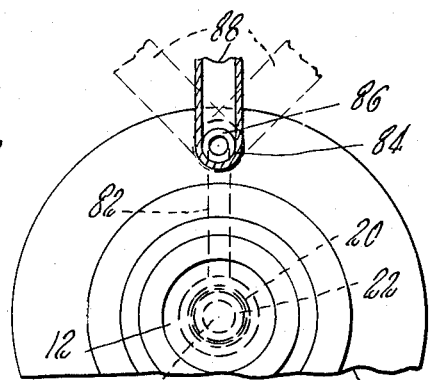
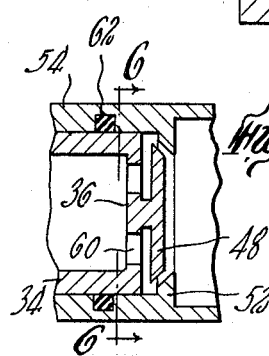
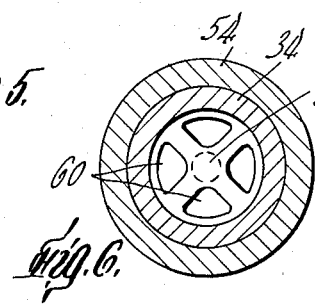
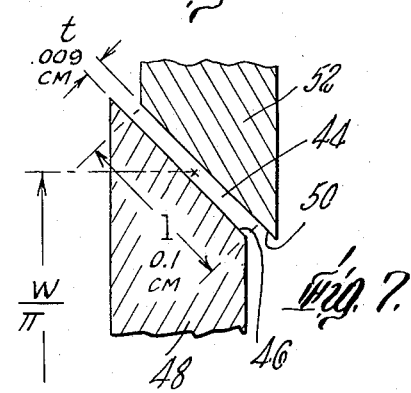

United States Patent Office 3,294,193
Patented Dec. 27, 1966

3,294,193
ACOUSTIC IMPEDANCE MEASURING
INSTRUMENT
Jozef J. Zwislocki, 311 Comstock Ave.,
Syracuse, N.Y. 13210
Filed Sept. 20, 1963, Ser. No. 310,270
11 Claims. (Cl. 181—.5)

This invention relates to acoustic apparatus and more particularly to apparatus for measuring acoustic impedances.

In the diagnosis and treatment of the ear, and particularly the middle ear function, autoscopic observations and audiometric tests have been employed. Each of these techniques is somewhat limited due to necessary reliance on subjective reactions of either the examiner or the patient, and it is an object of this invention to provide improved apparatus for use in the diagnosis and treatment of the ear.

A portion of the energy of an acoustic wave entering the ear is reflected, while the remaining portion produces vibration of the ear drum and is transmitted to the inner ear through the ossicular chain. The amplitude and phase of the reflected wave depend on the acoustic conditions encountered at the ear drum and are a function of the properties of such auditory components as the ear drum, the ossicular chain, the middle ear muscles and ligaments, the two cochlear windows, the middle ear cavity and the interconnected pneumatic cells. Thus, the acoustic wave reflected at the ear drum contains information of the complex inter-relationship of the components of the middle ear. These characteristics of the ear drum and associated auditory components may be meaningfully defined in terms of acoustic impedance.

It has been proposed to study the ear in terms of acoustic impedance, see e.g., Zwislocki, "Acoustic Measurement of the Middle Ear Function" (vol. 70 "Annals of Otology, Rhinology and Laryngology," page 599 (1961)), but the instrumentation heretofore available for this purpose involved difficult manipulations of the equipment and required complex mathematical calculations in order to obtain useful data.

Accordingly, it is an object of this invention to provide a novel and improved acoustical impedance measuring instrument.

Another object of the invention is to enable improved measurements of the acoustical impedance characteristics of the human ear.

Still another object of the invention is to provide novel and improved instrumentation that is easy to operate for the obtaining of accurate data on acoustical impedances.

A further object of the invention is to provide a novel and improved acoustical bridge construction.

In the embodiment of the invention, shown and described in detail herein, there is provided an acoustic bridge structure having an acoustically symmetrical electroacoustic transducer and two main tubes which extend outwardly in acoustically symmetrical relation from the transducer. One of the tubes is adapted to be coupled to the acoustic element whose impedance is to be measured, e.g. the ear drum in a preferred embodiment, and the other tube is coupled to a calibrated variable acoustic impedance system. A compensating structure in the form of a cylindrical chamber of adjustable volume is disposed between the transducer and the variable impedance system. The variable impedance system includes two adjustable impedance elements arranged to enable the acoustic resistance and reactance of the impedance system to be independently varied. Through the independent variation of these components the obtaining of meaningful measurements of acoustical characteristics of the system under investigation is facilitated.

An output device is coupled to the instrument by means of a Y tube system which bridges the transducer in an acoustically symmetrical manner. This Y tube W system comprises two tube portions of equal length each of which is rigidly connected to the corresponding main tube, and are disposed in opposed relation so that a narrow gap in the plane of symmetry of the bridge is defined between the two tube portions. An output tube is connected across that gap by a coupling element so that the amounts of acoustic energy reflected by the unknown impedance and the variable impedance system may be compared by a suitable output device. The coupling element is movable relative to the two tube portions and, in addition to facilitating manipulation of the output tube, alleviate pressure differentials in the Y tube system which might distort the impedance measurement.

While this improved acoustic bridge is particularly useful for investigation of the middle ear function, it also is useful generally as a diagnostic tool for various malfunctions of the middle ear as well as for post-operative checkups. In addition, it may be used for determination of loudness recruitment and of functional hearing loss and as such may be used as a standard instrument by otologists and audiologists. In general it is useful as an instrument whereby precise information on the nature of acoustical impedances may be obtained easily.

Other objects, features and advantages of the invention will be seen as the following description of a preferred embodiment thereof progresses, in conjunction with the drawings, in which:

FIG. 1 is a perspective view showing the acoustic bridge constructed in accordance with the invention in use disposed to measure acoustic impedance characteristics of a human ear, shown in dotted lines;

FIG. 2 is a sectional view of the acoustic bridge showing FIG. 1;

FIG. 3 is a sectional view of the electroacoustic transducer and Y tube system of the bridge drawn to a larger scale than that of FIG. 2;

FIG. 4 is a sectional view taken along the line 4—4 of FIG. 3 showing further details of the relationship of the transducer and Y tube system;

FIG. 5 is an enlarged view of the variable acoustic resistance element employed in the bridge shown in FIG. 2;

FIG. 6 is a sectional view taken along the line 6—6 of FIG. 5 showing further details of the resistance element; and FIG. 7 is a diagrammatic view of the resistance element slot.

The bridge shown in FIGS. 1–3 includes a symmetrical transducer unit 10 including a diaphragm 12 that is clamped between two main tube units 14, 16. The diaphragm is driven electromagnetically by coils 18, 20 to produce acoustic vibration for transfer through tubes 14, 16 in opposite (180°) phase relation. It will be obvious that the other forms of transducer elements may also be employed in the instrument without departing from the invention. Each soil mounting 22 is lylindrical and defines a passageway 24 for communication between diaphragm 12 and the tubes 14, 16.

The two main tubes 14, 16 are of theoretically identical length and cross section so that they are acoustically identical. Connected to main tube 16 is a compensating device in the form of a cavity 28 of adjustable volume and a matching impedance system 30 comprising a variable resistive impedance 32 and a variable reactive impedance 33.

The adjustable cavity 28 is formed by a cylindrical sleeve 34 which mates in sliding relation with the end of tube 16 and has a base 36 which may be moved toward and away from the end of tube 16. The sleeve 34 is secured relative to tube 16 by set screw 38. This cavity 28 provides compensation for the volume 40 of that portion of the outer ear canal between the end of the main tube 14 and the ear drum (diagrammatically indicated at 42) when the bridge is used for acoustical measurements of the impedance of the ear as indicated in FIG. 1, for example. A special adaptor provides a hermetic fit between the tube 14 and the ear canal 40. The volume of the unfilled portion of the canal 40 is then measured by well known means, as by filling with alcohol from a calibrated syringe. (The alcohol is withdrawn from the ear canal before an impedance measurement is made.) The adjustable cavity 28 is then set to the same volume as the amount of alcohol needed to fill the canal portion 40 by sliding sleeve 34 along the main tube 16 to a position indicated by calibrated markings placed on the main tube 16 and then locking the sleeve 34 in position by means of set screw 38.

The variable resistance 32 is a narrow slit 44 in the shape of a conical annulus having one wall 46 formed in a disc 48 carried by the base 36 of sleeve 34. A second wall 50 of the slit is formed in flange 52 of sleeve 54 which may be axially adjusted relative to sleeve 34 by means of precision screw threads 56. Base 36 of cavity 28 has perforations 60 which enable practically undistorted acoustical communication between cavity 28 and slit 44. A hermetic seal such as an O-ring 62 provides acoustic insulation between the slit and the screw threads 56.

The acoustic impedance of a narrow slit may be defined by the following equation:

$$Z = \frac{12\mu l}{wt^3} + j\frac{6\rho l\omega}{5wt}$$

where $\mu$ is the viscosity coefficient; $\rho$ is the density; $\omega$ equals $2\pi f$, where $f$ is the frequency of sound; $w$ is the width of the slit normal to the direction of wave travel; $t$ is the thickness of the slit normal to the direction of wave travel; and $l$ is the length of the slit in the direction of wave travel. The relation of these dimensions to the slit 44 is indicated diagrammatically in FIG. 7. It is apparent from the equation that for sufficiently small slit thicknesses ($t$) the reactance component can be neglected and the impedance of the slit becomes practically a pure resistance. For example, where the annular length ($w$) of the slit is 3.14 centimeters and the slit length ($l$) is 0.1 centimeter, a slit thickness ($t$) of 0.009 centimeter produces a resistance of approximately one hundred acoustic ohms, 0.004 centimeter a resistance of approximately one thousand acoustic ohms, and 0.0024 centimeter a resistance of approximately five thousand acoustic ohms. At a frequency of 100 cycles per second the reactive impedances are 3.24, 6.81 and 12 acoustic ohms respectively for these slit thicknesses. As the frequency increases the reactive impedance values increase but not sufficiently to impair the usefulness of acoustic impedance measurements within the frequency ranges usually employed to perform diagnostic measurements on the ear.

The reactive impedance of the human ear is almost always negative, especially below 1000 cycles, and accordingly, in instruments intended for use in that application, the reactive impedance element has that characteristic. That element is formed by a cylindrical extension 68 of sleeve 54 in which a piston 70 is mounted. The resulting cylindrical cavity 72 responds substantially as a pure compliance as long as its axial length is small compared to the sound wave length. For reactive values of interest in impedance measurements of the ear (over the range of up to about 1500 c.p.s.) this condition can easily be met. Piston 70 is sealed within the cylindrical wall of the extension 68 by means of O-ring 74 and the volume of cavity 72 is varied by moving the piston 70 axially within sleeve 68 by means of ring 76.

In the adjustment of these two independently variable impedance elements during operation of the bridge, sleeve 54 is held between the index and middle fingers and the piston 70 can be manipulated by the thumb which fits into the ring 76. The acoustical resistance is varied by rotating the sleeve while the acoustical reactance may be varied at the same time by axial adjustment of the piston 70. In these operations the axial motion of the flange 52 relative to the disc 48 does not exceed 0.01 centimeter so that effect on the volume 28 can be neglected.

The output of the bridge is obtained through a Y tube system, details of which are shown in FIG. 3. That system is acoustically symmetrical with respect to transducer 10 and includes two coupling tubes 80, 82 of identical configuration and of substantially smaller diameter than the main tubes 14, 16. Each coupling tube is in acoustical communication at one end with a corresponding main tube and includes an insert 84 which forms an extension at the other end. These inserts are employed to facilitate fabrication of the bridge and have end surfaces 86 disposed parallel to each other on either side of the plane of symmetry of the transducer 10 and are spaced in the order of 0.1 centimeter apart. The transducer is clamped between the tubes 14, 16 so that coupling member 88 bridges the gap between the surfaces 86 being carried by the inserts 84. The fit between inserts 84 and member 88 is not a hermetic seal but rather a relatively loose fit so that the coupling member 88 and the output tube 90 that is connected to it are free to rotate with respect to the tubes 80, 82 as indicated in FIG. 4. While a small amount of air leakage does result, this leakage does not introduce an objectionable acoustic asymmetry since the source of significant acoustic energy is the gap between surfaces 86 which is at the plane of symmetry of the bridge..

In operation, the diaphragm 12 is vibrated by two electromagnetic elements 18 and 20 disposed on either side thereof to generate two acoustic waves that are 180° out of phase. Each acoustic wave is reflected by an impedance, that in tube 14 by the unknown impedance (the ear drum for example) and that in tube 16 by the variable impedance system, and transmitted back to the Y tube system where the difference in reflected energy at the gap between surfaces 86 is sensed by suitable means coupled to the output tube 90. When a minimal reflected energy differential point is determined through adjustment of the impedance components, an indication of the effective value of the unknown impedance in real and imaginary terms can be read directly from the axial setting of piston 70 and the circumferential setting of sleeve 54.

Thus it will be seen that the invention provides an improved acoustic bridge particularly useful in performing impedance measurements on the human ear. While a preferred embodiment of the invention has been shown and described, various modifications therein will be obvious to those skilled in the art and therefore it is not intended that the invention be limited to the disclosed embodiment or to details thereof and departures may be made therefrom within the spirit and scope of the invention as defined in the claims.

What is claimed is:

1. An acoustic bridge comprising an acoustically symmetrical transducer, two main tubes disposed in acoustically symmetrical relation to said transducer, a variable acoustic impedance system, one of said main tubes being adapted to be coupled to an unknown acoustic impedance by means of a coupling cavity and the other tube being coupled to said variable acoustic impedance system, a chamber adjustable to the volume of said coupling cavity disposed between said acoustic impedance system and said other tube providing acoustical communication therebetween, said chamber having a cross-sectional area substantially larger than the cross-sectional area of said other tube, and an output system connected to said main tubes and bridging said transducer in an acoustically symmetrical manner for coupling an output signal from said bridge.

2. An acoustic bridge comprising an acoustically symmetrical transducer, two main tubes disposed in acoustically symmetrical relation to said transducer, a variable acoustic impedance system, one of said main tubes being adapted to be coupled to an unknown acoustic impedance and the other tube being coupled to said variable acoustic impedance system, said acoustic impedance system including a sleeve received on said other tube, said sleeve having a threaded section on its outer surface intermediate its end and carrying a disc at its end remote from said other tube, the portion of said sleeve between said disc and the end of said other tube defining a cavity which provides compensation for the unknown acoustic impedance to be coupled to said one tube, a second sleeve having a threaded portion at one end for engagement with the threaded portion on said first sleeve, a chamber extension at the other end of substantially larger cross-sectional area than said other tube adapted to receive a plunger and a radially inwardly projecting flange positioned between said third portion and said chamber portion of said second sleeve for cooperation with said disc to form a slit, the width of which in the direction normal to the direction of flow of acoustical energy through said slit may be varied by rotation of said second sleeve relative to said first sleeve, and a plunger disposed in the chamber portion of said second sleeve to define a chamber of variable volume whose linear dimensions are small compared to the usual wave length of operation so that said chamber provides an acoustic compliance as a direct function of the position of said plunger in said chamber portion, and an output system connected to said main tubes and bridging said transducer in an accoustically symmetrical manner for coupling an output signal from said bridge.

3. Apparatus for measuring acoustical impedance comprising an acoustically symmetrical transducer, two main tubes disposed in acoustically symmetrical relation to said transducer, a variable acoustic impedance system, one of said main tubes being adapted to be coupled to an unknown acoustic impedance and the other tube being coupled to said variable acoustic impedance system, said acoustic impedance system including a continuously variable acoustic reactance and a continuously variable acoustic resistance, a chamber of substantially larger cross-sectional area than said other tube and of adjustable volume disposed between said acoustic impedance system and said other tube providing acoustical communication therebetween, and an output system connected to said main tube and bridging said transducer in an acoustically symmetrical manner for coupling an output signal from said apparatus.

4. The apparatus as claimed in claim 3 wherein said resistance is connected in series with said reactance between said transducer and said reactance.

5. The apparatus as claimed in claim 3 wherein said reactance comprises a piston mounted within a cylinder for movement along the axis of said other tube toward and away from said transducer, said piston and said cylinder defining a chamber of variable volume whose linear dimensions are small compared with the operating wave length of the apparatus so that the position of said piston relative to said cylinder provides a direct indication of an acoustic compliance.

6. The apparatus as claimed in claim 3 wherein said output system includes two branches, one end of each branch being connected rigidly to a corresponding main tube with the other ends of said branches disposed in opposed relation to define a narrow gap in the plane of said transducer, an output tube, and a coupling member enclosing said gap and movable relative to said branches for connecting said branches to said output tube and providing an acoustically symmetrical air leakage around said branches.

7. Apparatus for measuring acoustical impedance comprising an acoustically symmetrical transducer, two main tubes disposed in acoustically symmetrical relation to said transducer, a variable acoustic impedance system, one of said main tubes being adapted to be coupled to an unknown acoustic impedance and the other tube being coupled to said variable acoustic impedance system, said acoustic impedance system including a variable acoustic reactance comprising a piston of substantially larger cross-sectional area than the cross-sectional area of said main tubes mounted within a cylinder for movement along the axis of said other tube toward and away from said transducer and a circular slit and further including a screw arrangement disposed coaxially with respect to said other tube for varying the width of said slit, and an output system connected to said main tubes and bridging said transducer in an acoustically symmetrical manner.

8. The apparatus as claimed in claim 7 and further including a chamber of cross-sectional area substantially larger than the cross-sectional area of said other tube and of adjustable volume disposed between said acoustic impedance system and said other tube and providing acoustical communication therebetween.

9. The apparatus as claimed in claim 8 wherein said output system includes two branches, one end of each branch being connected rigidly to a corresponding main tube with the other ends of said branches disposed in opposed relation to define a narrow gap in the plane of said transducer, an output tube, and a coupling member enclosing said gap and movable relative to said branches for connecting said branches to said output tube, said coupling member providing acoustically symmetrical air leakage at the ends of said branches.

10. An acoustic bridge comprising an acoustically symmetrical transducer, two main tubes disposed in acoustically symmetrical relation to said transducer, a variable acoustic impedance system, one of said main tubes being adapted to be coupled to an unknown acoustic impedance and the other tube being coupled to said variable acoustic impedance system, and an output system connected to said main tubes and bridging said transducer in an acoustically symmetrical manner, said output system including two branches, one end of each branch being connected rigidly to a corresponding main tube with the other ends of said branches disposed in opposed relation to define a narrow gap in the plane of said transducer, said branches being of equal length and each providing a sealed passage from said corresponding main tube to the other end of the branch, a tubular output member, and a coupling member enclosing said gap and movable relative to said branches for connecting said branches to said output member, said coupling member providing leakage between it and the outer surface of at least one of said branches.

11. Apparatus for measuring acoustical impedance comprising an acoustically symmetrical transducer, two main tubes disposed in acoustically symmetrical relation to said transducer, a variable acoustic impedance system, one of said main tubes being adapted to be coupled to an unknown acoustic impedance and the other tube being coupled to said variable acoustic impedance system, said acoustic impedance system including a variable acoustic reactance and a variable acoustic resistance, said variable acoustic resistance including structure defining a circular slit, the surfaces of which are disposed at an angle of at least about 45° to the axis of said other tube, an unobstructed chamber on either side of said slit, each said chamber having a cross-sectional dimension at least as large as the cross-sectional dimension of the slit portion immediately adjacent that chamber and an axial length greater than the axial length of said slit, and a screw arrangement disposed coaxially with respect to said other tube for varying the width of said slit, and an output system connected to said main tube and bridging said transducer in an acoustically symmetrical manner for coupling an output signal from said apparatus.

References Cited by the Examiner

UNITED STATES PATENTS

| | | | |
|---|---|---|---|
| 1,356,359 | 10/1920 | Heck | 181—.5 |
| 1,784,830 | 12/1930 | Flanders | 181—.5 |
| 1,816,917 | 8/1931 | Smythe et al. | 181—.5 |

OTHER REFERENCES

J. Zwislocki: "Acoustic Measurement of the Middle Ear Function," Annals of Otology, Rhinology and Laryngology, vol. 70 (1961), XLVI (pages 604–606 relied on).

BENJAMIN A. BORCHELT, *Primary Examiner.*

W. KUJAWA, *Assistant Examiner.*